No. 786,624. PATENTED APR. 4, 1905.
M. P. BURT.
MEAT HANGER.
APPLICATION FILED DEC. 1, 1904.
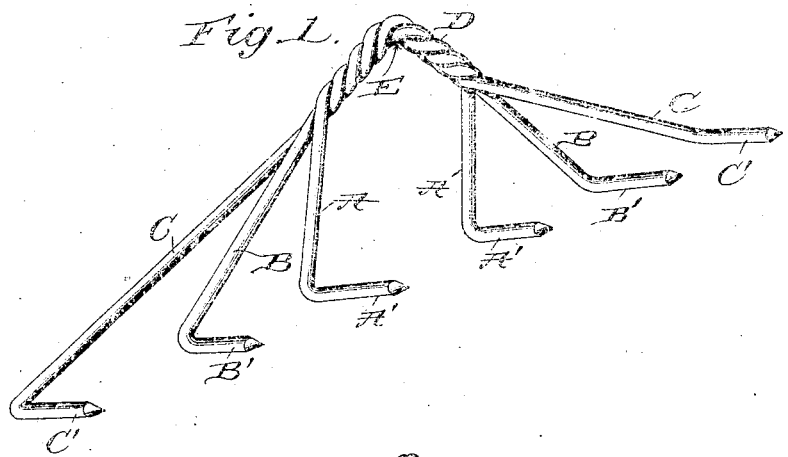
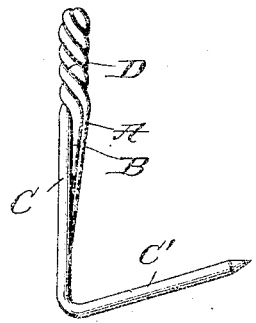
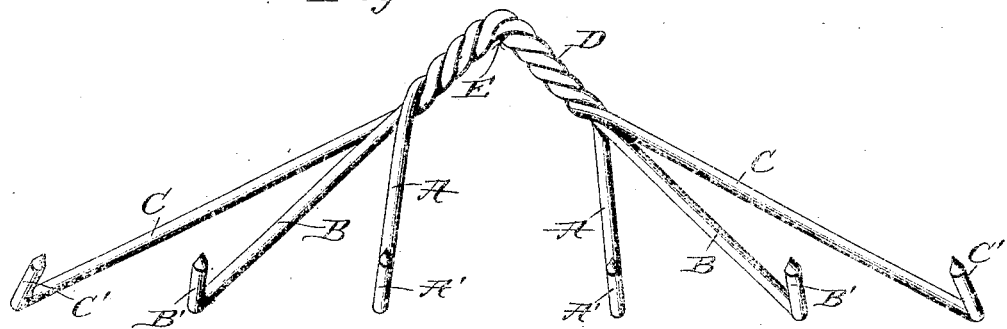

No. 786,624. Patented April 4, 1905.

UNITED STATES PATENT OFFICE.

MILTON P. BURT, OF KANSAS CITY, MISSOURI, ASSIGNOR TO SCHWARZSCHILD & SULZBERGER COMPANY, OF KANSAS CITY, KANSAS, A CORPORATION OF NEW YORK.

MEAT-HANGER.

SPECIFICATION forming part of Letters Patent No. 786,624, dated April 4, 1905.

Application filed December 1, 1904. Serial No. 235,075.

*To all whom it may concern:*

Be it known that I, MILTON P. BURT, a citizen of the United States, residing at Kansas City, in the county of Jackson and State of Missouri, have invented certain new and useful Improvements in Meat-Hangers, of which the following is a specification.

My present invention pertains to improvements in meat-hangers, the construction and advantages of which will be hereinafter set forth, reference being had to the annexed drawings, wherein—

Figure 1 is a perspective view of the hanger; Fig. 2, an end view, and Fig. 3 a front face view.

The object of the present invention is to produce a simple and efficient meat-hanger which is more especially adapted to suspend bacon and to hold the side in an extended and flattened condition. The hanger not only holds the side in this condition, but is so constructed that it is retained thereon in such manner that there is no tendency for the bacon to become disengaged therefrom.

The hanger in the embodiment shown is composed of three pieces of wire A, B, and C, twisted together at their mid-length, forming a body portion D. The body is bent downwardly at each side of its center, as is most clearly shown in Fig. 3, the parts standing at an angle of approximately ninety degrees to each other, and thus affording a bearing-point E for a suspending hook, rod, or other device upon which the hanger may be placed.

Wire A is the shortest of the three, and its arms are bent down out of line with the body at such an angle as to bring them in substantial parallelism. The ends of the arms are sharpened and bent outwardly and upwardly to a slight extent, thereby forming a pair of hooks or prongs A' A'. The ends of the hooks or prongs are preferably given a slight inclination toward each other, as will be seen upon reference to Fig. 3.

Wire B is of intermediate length, its arms standing in approximate alinement with the corresponding portions of the body. Hooks or prongs B' B' (similar to prongs A') are formed thereon, the outer ends of prongs B', however, being inclined inwardly to a slightly greater extent than prongs A'.

Wire C is of the greatest length, and the hooks or prongs C'' C'' thereof, formed in a manner similar to prongs A' and B', are inclined inwardly or converge to a greater extent than said prongs.

As will be seen upon reference to Fig. 3, the ends of the prongs stand in alinement, and inasmuch as the upward inclination of each prong is the same their points of junction with the wire arms also stand in alinement.

When in use, the prongs are forced into a piece of bacon, and by reason of their upward inclination the meat is held securely thereon. Owing to the fact that the ends or points of the prongs are closer together than the roots or bodies thereof, the bacon will be distended or stretched to a slight degree as the hooks are passed through the same.

It is of course conceivable that a greater or less number of wires than those shown may be employed in constructing the hanger. Three wires with six prongs are found in practice, however, to form a hanger of the proper proportions for the usual or average side of bacon.

Having thus described my invention, what I claim is—

1. A meat-hanger, comprising a series of wires of different lengths twisted together at their mid-length forming a body portion, said body being likewise bent at its mid-length so that the diverging portions thereof stand at an angle of approximately ninety degrees to each other, the arms of the short wire extending downwardly from said body portion, the arms of the longer wire (or wires) being given a greater spread, and the ends of all the wires being bent outwardly and upwardly to a slight extent and inclined inwardly toward the body of the hanger, substantially as described.

2. A meat-hanger, comprising a series of wires of different lengths secured together at substantially their mid-length, the ends of the wires upon each side of the secured portion extending downwardly therefrom and having their ends bent outwardly and upwardly, forming hooks or prongs, the hooks upon one side of the center of the hanger converging toward those upon the opposite side.

In testimony whereof I have signed my name to this specification in the presence of two subscribing witnesses.

MILTON P. BURT.

Witnesses:
   JACOB MOOG,
   JOSEPH L. MCCABE.